(12) United States Patent
Liao

(10) Patent No.: US 11,971,129 B1
(45) Date of Patent: Apr. 30, 2024

(54) ROTARY IMAGING SYSTEM AND METHOD OF ROTARY DEVICE AND ROTARY DEVICE

(71) Applicant: DongGuan Tesmai Electronic Technology Co., LTD, Guangdong (CN)

(72) Inventor: Yinwei Liao, Guangdong (CN)

(*) Notice: Subject to any disclaimer, the term of this patent is extended or adjusted under 35 U.S.C. 154(b) by 0 days.

(21) Appl. No.: 18/237,865

(22) Filed: Aug. 24, 2023

(30) Foreign Application Priority Data

Jun. 1, 2023 (CN) .......................... 202310648465.7

(51) Int. Cl.
*F16M 1/04* (2006.01)
*G01P 1/02* (2006.01)
*G01P 1/04* (2006.01)
*G03B 17/56* (2021.01)

(52) U.S. Cl.
CPC .............. *F16M 1/04* (2013.01); *G01P 1/023* (2013.01); *G01P 1/04* (2013.01); *G03B 17/561* (2013.01)

(58) Field of Classification Search
CPC ......... G03B 17/561; G01P 1/04; G01P 1/023; F16M 1/04
See application file for complete search history.

(56) References Cited

U.S. PATENT DOCUMENTS

| | | | | |
|---|---|---|---|---|
| 8,067,738 | B1* | 11/2011 | Heath | G01J 3/36 |
| | | | | 250/338.1 |
| 8,957,355 | B1* | 2/2015 | Truncale | F42B 15/01 |
| | | | | 439/55 |
| 9,482,685 | B1* | 11/2016 | Bibeault | G01C 19/08 |
| 2005/0259984 | A1* | 11/2005 | Wright | G03B 17/561 |
| | | | | 396/427 |
| 2015/0097950 | A1* | 4/2015 | Wang | H04N 23/55 |
| | | | | 348/208.11 |

FOREIGN PATENT DOCUMENTS

CN 110458614 A * 11/2019

* cited by examiner

*Primary Examiner* — Forrest M Phillips
(74) *Attorney, Agent, or Firm* — Hawaii Patent Services; Nathaniel K. Fedde; Kenton N. Fedde

(57) ABSTRACT

The present invention relates to the field of rotary imaging, in particular to a rotary imaging system, a rotary imaging method and a rotary device. A rotary imaging system of a rotary device comprises a rotating body with a lamp belt module group; a circuit board installed on the rotating body, the circuit board rotating synchronously with the rotating body; an acceleration detection component installed at a predetermined position on the circuit board for acquiring acceleration detection data at the predetermined position when the circuit board rotates; and a control module used for obtaining an acceleration value of the predetermined position based on the acceleration detection data, further obtaining a rotation speed value of the circuit board based on the acceleration value and a position parameter corresponding to the predetermined position, and driving the lamp belt module group to realize rotary imaging based on the rotation speed value.

17 Claims, 8 Drawing Sheets

ROTARY IMAGING SYSTEM AND METHOD OF ROTARY DEVICE AND ROTARY DEVICE

TECHNICAL FIELD

The present invention relates to the field of rotary imaging, in particular to a rotary imaging system, a rotary imaging method and a rotary device.

BACKGROUND

A lamp belt is arranged on a high-speed rotating gyro or a rotating aircraft, so that rotary imaging can be carried out through the lamp belt, specifically, the gyro or the aircraft in the rotating process can display patterns or characters, thereby increasing the interest.

In the process of rotary imaging of lamp belt, most of them use a photoelectric encoder or a Hall element to measure the rotating speed of a lamp belt, and these methods need to measure the rotating speed with the help of static reference points. For example, the China patent CN206950652U discloses a fingertip gyro, which uses an upper top cover or a lower top cover to provide a stationary reference point for a rotating lamp belt. Another example is the China patent CN207503607U. This solution can also measure the rotating speed of the lamp belt by taking the drone as a stationary reference point.

However, when the whole lamp belt carrier rotates or is in motion relative to the ground, it will have different characteristics due to the influence of gravity. These methods of measuring the rotating speed by using the static reference point are usually no longer applicable. At the same time, when the whole lamp belt carrier rotates, its rotating speed will change due to the user's operating function requirements or external force, and the rotary imaging of the lamp belt is very high for the real-time control of the rotating speed requirements of the lamp belt, which depends on the accurate measurement of the rotating speed of the lamp belt.

A gyroscope can also be used to measure the rotating speed of the rotating body. However, the maximum range of the existing gyroscope is usually ±2000°/sec, which is only suitable for the rotating body with a low rotating speed. For the object rotating at high speed, it is obviously not ideal to use gyroscope to measure the rotating speed.

Therefore, how to measure the rotating speed of the rotary device equipped with the lamp belt, realize the accurate measurement of the rotating speed of the lamp belt, and carry out the rotary imaging of the lamp belt according to the measured rotating speed has become an urgent technical problem.

SUMMARY

In view of the shortcomings of the above-mentioned prior art, it is an object of the present invention to provide a rotary imaging system, a method and a rotary device of a rotary device, which can accurately measure the rotating speed of a lamp belt and perform rotary imaging of the lamp belt according to the measured rotating speed.

In order to achieve the above purpose, the present invention adopts the following technical solution:

In an aspect, the present invention provides a rotary imaging system of a rotary device, including:

a rotating body with a lamp belt module group;
a circuit board installed on the rotating body, the circuit board rotating synchronously with the rotating body;
an acceleration detection component installed at a predetermined position on the circuit board for acquiring acceleration detection data at the predetermined position when the circuit board rotates; and
a control module installed on the circuit board and respectively connected with the lamp belt module group and the acceleration detection component, used for obtaining an acceleration value of the predetermined position based on the acceleration detection data, further obtaining a rotation speed value of the circuit board based on the acceleration value and a position parameter corresponding to the predetermined position, and driving the lamp belt module group to realize rotary imaging based on the rotation speed value.

Further, the acceleration value of the predetermined position is obtained based on the acceleration detection data, and the rotation speed value of the circuit board is further obtained based on the acceleration value and the position parameter corresponding to the predetermined position, which specifically includes:

obtaining the acceleration value based on the acceleration detection data;
obtaining a period number of the circuit board based on the acceleration value and the position parameter; and
obtaining the rotation speed value based on the period number.

Further, the acceleration detection component includes a first accelerometer and a second accelerometer; the first accelerometer and the second accelerometer are symmetrically arranged on the circuit board with an rotation axis of the rotating body as a center;

the acceleration detection data include first detection data obtained by the first accelerometer and second detection data obtained by the second accelerometer; the position parameter includes a first rotation radius of the first accelerometer or the second accelerometer.

Further, obtaining the period number of the circuit board based on the acceleration value and the position parameter specifically includes:

obtaining the period number based on a first period number calculation formula; wherein the first period number calculation formula is:

$$T = \sqrt{8\pi^2 R_1/(a_1+a_2)};$$

where T is the period number; $R_1$ is the first rotation radius; $a_1$ is the first detection data; $a_2$ is the second detection data.

Further, obtaining the period number of the circuit board based on the acceleration value and the position parameter specifically includes:

acquiring a static detection value and a position deviation value of the first accelerometer and the second accelerometer;
performing compensation calculation based on the first detection data, the second detection data, the rotation radius, the static detection value and the position deviation value to obtain the period number; wherein a formula of the compensation calculation is:

$$T = \sqrt{4\pi^2(2R_1+\Delta R)/(a_1+a_2-a_0)};$$

where T is the period number; $R_1$ is the rotation radius; $\Delta R$ the position deviation value of the first accelerometer and the second accelerometer; $a_1$ is the first detection data; $a_2$ is the second detection data; $a_0$ is the static detection value of the first accelerometer and the second accelerometer.

Further, the acceleration detection component includes a third accelerometer; by taking a connecting line between the third accelerometer and a rotation center of the circuit board as an axis, the third accelerometer has a first speed measuring direction deviating from the axis by a first predetermined angle and a second speed measuring direction deviating from the axis by a second predetermined angle; the acceleration detection data includes first direction detection data corresponding to the first speed measuring direction and second direction detection data corresponding to the second speed measuring direction; the position parameter includes a second rotation radius of the third accelerometer; a sum of the first predetermined angle and the second predetermined angle is 90 degrees;

the control module is further used for judging whether a rotating surface of the circuit board is horizontal based on the first direction detection data and the second direction detection data, and if so, using a second period number calculation formula to obtain the period number based on the first direction detection data, the second direction detection data and the second rotation radius; the second period number calculation formula is:

$$T = 2\pi/\sqrt{(a_3 COS\theta + a_4 SIN\theta)/R};$$

where T is the period number; $a_3$ is the first direction detection data; $a_4$ the second irection detection data; $R_2$ is the second rotation radius; $\theta$ is a first predetermined angle.

Further, if the rotating surface is not horizontal, the following steps are executed:

respectively acquiring the acceleration detection data of an up zero-crossing point and the down zero-crossing point; wherein the up zero-crossing point is a position with a highest relative horizontal plane of rotation of the third accelerometer, and the down zero-crossing point is a position a lowest relative horizontal plane of rotation of the third accelerometer;

using a third period calculation formula to obtain the period number based on the acceleration detection data of the up zero-crossing point and the down zero-crossing point and the second rotation radius; the third period number calculation formula is:

$$T = 2\pi/\sqrt{((a_3up*COS\theta + a_4up*SIN\theta + a_3down*COS\theta + a_4down*SIN\theta)/R_2)/2};$$

where, T is the period number, and $a_3up$ is the first direction detection data of the up zero-crossing point; $a_4up$ is the second direction detection data of the up zero-crossing point; $a_3down$ is the first direction detection data of the down zero-crossing point; $a_4down$ is the second direction detecting data of the down zero-crossing point; $R_2$ is the second rotation radius; $\theta$ is a first predetermined angle.

Further, the step of acquiring the rotation speed value of the circuit board specifically includes:

matching from a period database based on the acceleration detection data and the position parameter to obtain the period number; wherein the period database includes period numbers of a plurality of position parameters under different acceleration values; and obtaining the rotation speed value based on the period number.

In another aspect, the present invention provides a rotary imaging method of a rotary device, including:

acquiring acceleration detection data at a predetermined position on a circuit board; the circuit board rotating synchronously with a rotating body of the rotary device;

obtaining an acceleration value of the predetermined position based on the acceleration detection data;

obtaining a period number based on the acceleration value and a position parameter corresponding to the predetermined position; and obtaining a rotation speed value of the circuit board based on the period number, and driving a lamp belt module group to realize rotary imaging based on the rotation speed value.

In another aspect, the present invention provides a rotary device using the rotary imaging system of a rotary device.

Compared with the prior art, the rotary imaging system, the rotary imaging method and the rotary device provided by the present invention have the following beneficial effects:

By using the rotary imaging system provided by the present invention, the circuit board is set to rotate synchronously with the rotating body, the acceleration value at the position is obtained through the acceleration detection data set at the predetermined position on the circuit board, and then the rotation speed value of the circuit board is obtained through the acceleration value and the position parameters; because the circuit board rotates synchronously with the rotating body, the rotation speed of the circuit board and the rotating body are the same, and then adaptive control can be carried out for the lamp belt module group to realize rotary imaging.

DESCRIPTION OF EMBODIMENTS

Figure 1:
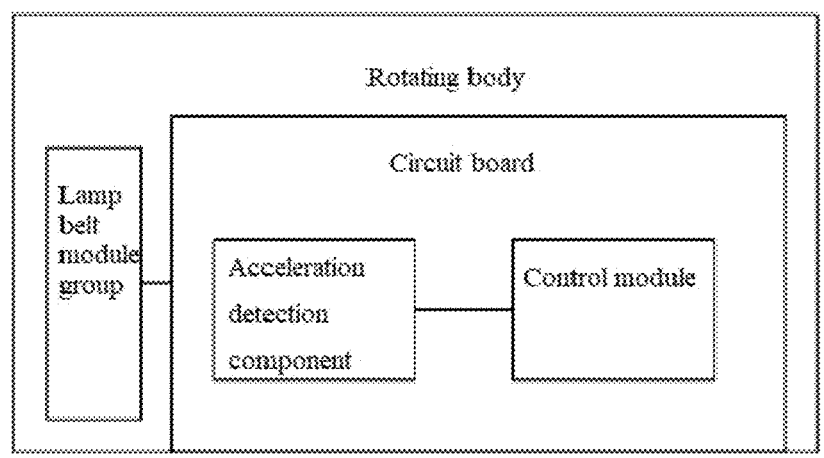
FIG. 1 is a structural block diagram of a rotary imaging system provided by the present invention.

In order to make the object, technical solution and effect of the present invention more clear and definite, the present invention will be further described in detail with reference to the attached drawings and examples. It should be understood that the specific embodiments described here are only used to explain the present invention, and are not used to limit the present invention.

It should be understood by those skilled in the art that both the foregoing general description and the following detailed description are exemplary and illustrative specific embodiments of the present invention and are not intended to limit the present invention.

The terms "including", "containing" or any other variation thereof herein are intended to cover non-exclusive inclusion, so that a process or method that includes a list of steps includes not only those steps, but also other steps not explicitly listed or inherent to such process or method. Similarly, without more restrictions, one or more devices or subsystems, elements or structures or components beginning with "including . . . one" will not be without more restrictions, excluding the existence of other devices or other subsystems or other elements or other structures or other components. Throughout this specification, the appearances of the phrases "in one embodiment", "in another embodiment" and similar language may, but not necessarily, all refer to the same embodiment.

In the description of this application, descriptions referring to the terms "one embodiment", "some embodiments", "illustrative embodiments", "examples", "specific examples" or "some examples" mean that specific features, structures, materials or characteristics described in connection with this embodiment or example are included in at least one embodiment or example of this application. In this specification, the schematic expressions of the above terms do not necessarily refer to the same embodiment or example. Moreover, the specific features, structures, materials or characteristics described may be combined in any one or more embodiments or examples in a suitable manner.

In this application, for convenience, words and expressions indicating orientation or positional relationship such as "middle", "upper", "lower", "front", "rear", "vertical", "horizontal", "top", "inner" and "outer" are used to illustrate the positional relationship of constituent elements with reference to the attached drawings, only for convenience. The positional relationship of the constituent elements is appropriately changed according to the direction of the described constituent elements. Therefore, it is not limited to the words and expressions described in the specification, and can be replaced appropriately according to the situation.

Unless otherwise defined, all technical and scientific terms used herein have the same meaning as commonly understood by one of ordinary skill in the art to which this present invention belongs.

The rotary imaging of a lamp belt uses POV phenomenon (Persistence of vision phenomenon), and the principle of this phenomenon is common knowledge, which is beyond the scope of this paper. The use of POV phenomenon to display graphics by a lamp belt is mainly influenced by three factors, including the initial position of light beads, the rotation speed of the lamp belt and the lighting program of the lamp belt. Among them, the initial position of the lamp bead is the inherent property of the lamp belt, which is determined when the lamp belt is made, so it is not discussed in this paper. The rotating speed of the lamp belt and the lighting program of the lamp belt are interrelated. On the one hand, the lamp belt can display graphics by manually programming the lighting program, and then the rotating speed of the lamp belt can be measured and controlled by the computer. On the other hand, the corresponding lighting program can be written by calculating the rotating speed of the lamp belt first. Therefore, in order to make the lamp belt display preset graphics, it is an important part to measure the speed of the lamp belt.

In the prior art, as described in the background of the application, the device using the lamp belt scanning imaging usually needs a static reference point to help measure the rotating speed of the lamp belt, but when the carrier does not have a static reference point, this method of measuring the rotating speed is no longer effective, which greatly limits the development of the lamp belt scanning imaging technology. At the same time, the speed of the lamp belt can not be accurately obtained, which will also affect the quality of scanning imaging of the lamp belt and reduce the sense of experience.

In order to solve the problems mentioned above and in the background, the application provides a rotary imaging method of a rotary device, which can avoid the disadvantage of the need for a stationary reference point in the existing calculation method, obtain the instantaneous rotating speed of the lamp belt, and improve the scanning imaging quality of the lamp belt.

In the calculation of rotational speed, accelerometer is widely used in more and more fields because of its high accuracy and low cost. By using its characteristics, if the accelerometer is fixed on the rotating carrier, then in the process of rotation, the accelerometer can sense many physical quantities directly related to rotation, such as the centrifugal acceleration of rotation, the change of the component of gravity acceleration on the measuring axis caused by the change of accelerometer orientation, etc., so as long as these physical quantities are extracted from the output signal of the accelerometer, the rotational speed (or speed) of the carrier can be obtained. Therefore, the accelerometer is used as the data acquisition device for speed measurement in this application.

Figure 7:
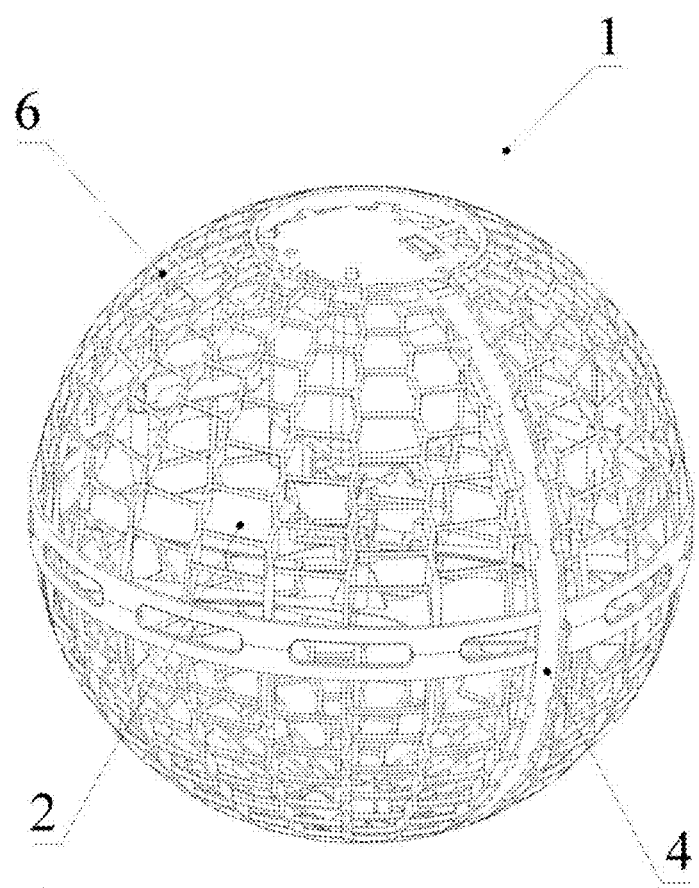
FIG. 7 is a schematic structural view of the rotary device provided by the present invention.
Figure 8:
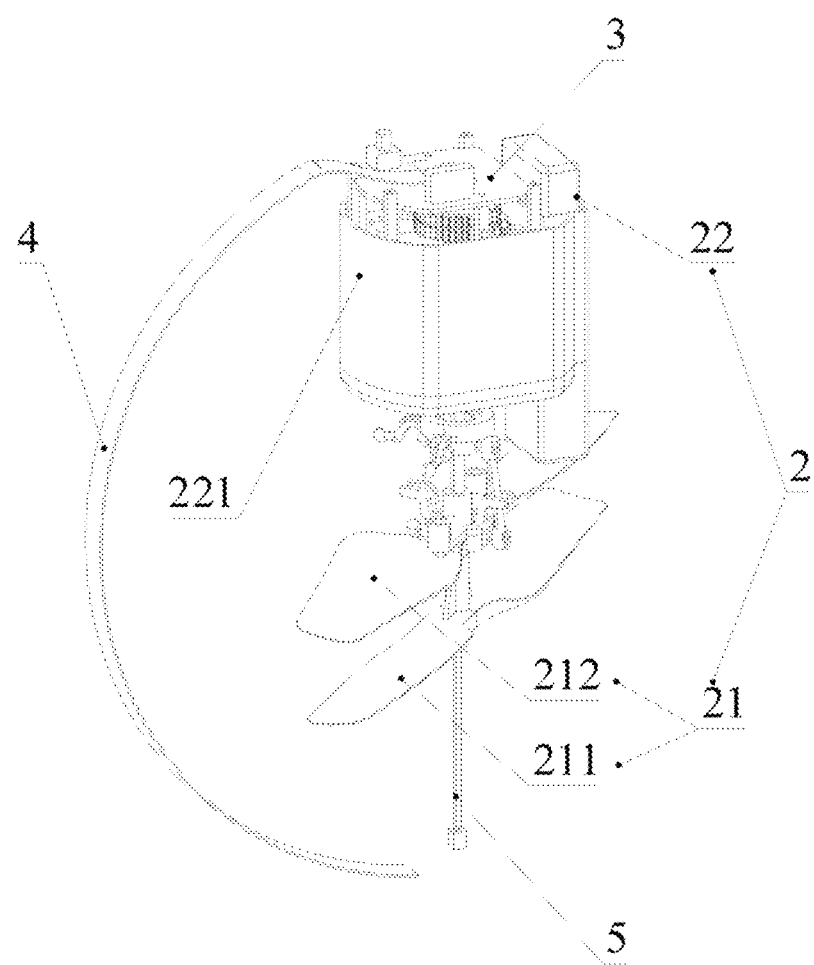
FIG. 8 is a schematic diagram of the internal structure of the rotary device provided by the present invention.

Please refer to FIG. 1, FIG. 7 and FIG. 8. The present invention provides a rotary imaging system of a rotary device, which is applied to the rotary device; the rotary device includes:

a rotating module group 2 including a rotating module 21 and a driving module 22, wherein the rotating module 21 is arranged at the bottom of the driving module 22 and connected with the driving module 22;

a control module group 3 arranged at the top of the driving module 22 to control the driving module 22 to work normally; wherein the control module group 3 includes an acceleration detection module 31, a circuit board 32, a memory 33 and a control module 34; the memory 33 is configured to store the acceleration detection data of the measuring axis of the acceleration detection component 31, and the control module 34 is configured to calculate the rotation speed of the rotary device 1 by using the rotation speed calculation method provided by the present invention according to the acceleration detection data of the measuring axis stored in the memory 33; the control module 34 is preferably an MCU or a CPU;

a lamp belt module group 4 electrically connected with the circuit board 32 and further connected with the control module 34.

The rotary imaging system is used for assisting in detecting the rotating speed value of the rotary device and further performing imaging control, and specifically includes:

a rotating body with a lamp belt module group 4, wherein basic components such as the rotating module are also installed on the rotating body synchronously, so that the rotating action can be realized; further, the rotating body is the main structure of the rotary device common in the field;

the circuit board installed on the rotating body, wherein the circuit board rotates synchronously with the rotating body;

an acceleration detection component installed at a predetermined position on the circuit board for acquiring acceleration detection data at the predetermined position when the circuit board rotates; wherein specifically, the acceleration detection component includes one or more accelerometers, and when the number of the accelerometers is one, the detection data of the accelerometers is directly used as the acceleration value; when the number of accelerometers is more than one, they are installed on the circuit board according to a predetermined rule, for example, a plurality of accelerometers are symmetrically arranged on the circuit board according to the axis;

the control module 34 that is installed on the circuit board and connected with the lamp belt module group 4 and the acceleration detection component respectively, and obtains the acceleration value of the predetermined position based on the acceleration detection data, and then obtains the rotation speed value of the circuit board based on the acceleration value and the position parameters corresponding to the predetermined position, and drives the lamp belt module group 4 to realize rotary imaging based on the rotation speed value; wherein specifically, the acceleration value includes tangential acceleration and normal acceleration, which are obtained by using appropriate algorithms according to different requirements; when there are a plurality of accelerometers, two axisymmetrical accelerometers can be used as a group to calculate at least one acceleration value, and then the average value can be obtained as the final acceleration value. In the following embodiments, the acceleration value is taken as the normal acceleration for calculation, and correspondingly, the acceleration value is set in a real-time mode of tangential acceleration, which is not limited by the present invention.

Using the rotary imaging system provided by the present invention, the circuit board is set to rotate synchronously with the rotating body, the acceleration value at the predetermined position on the circuit board is obtained through the acceleration detection data, and then the rotation speed value of the circuit board is obtained through the acceleration value and the position parameter. Because the circuit board rotates synchronously with the rotating body, the rotation speed of the circuit board and the rotating body are the same, and then the rotary imaging can be realized through adaptive control for the lamp belt module group 4. According to the present invention, the acceleration value of the rotary device is calculated based on the detection data of the accelerometer, and the instantaneous rotating speed of the rotary device can be quickly calculated, so that the response speed is extremely high.

Further, driving the lamp belt module group 4 to realize rotary imaging specifically includes:

obtaining the control mode corresponding to the rotation speed value, and driving the lamp belt module group 4 to work based on the control mode, so as to realize the rotary imaging of the lamp belt module group 4; it should be noted that in this embodiment, the control method adopts the conventional operation in the field, and the present invention is not limited.

Further, as a preferred solution, in this embodiment, the acceleration value of the predetermined position is obtained based on the acceleration detection data, and then the rotation speed value of the circuit board is obtained based on the acceleration value and the position parameter corresponding to the predetermined position, specifically including:

obtaining the acceleration value based on the acceleration detection data;

obtaining the period number of the circuit board based on the acceleration value and the position parameter; and obtaining the rotation speed value based on the period number.

It should be noted that the predetermined position and the rotation axis of the circuit board form a measuring axis, which faces the direction of the radius of the predetermined position, and the length of the measuring axis is the rotation radius of the acceleration detection component. The acceleration value is obtained based on the formula $a=\omega^2 R$, the period number is calculated based on the formula $T=2\pi/\omega$, and the rotation speed value is calculated based on the formula $f=1/T$, where a represents the acceleration value of the object, R represents the rotation radius of the object, $\omega$ represents the angular velocity of the object, T represents the rotation period of the object, and f represents the rotation speed of the object.

Figure 2:
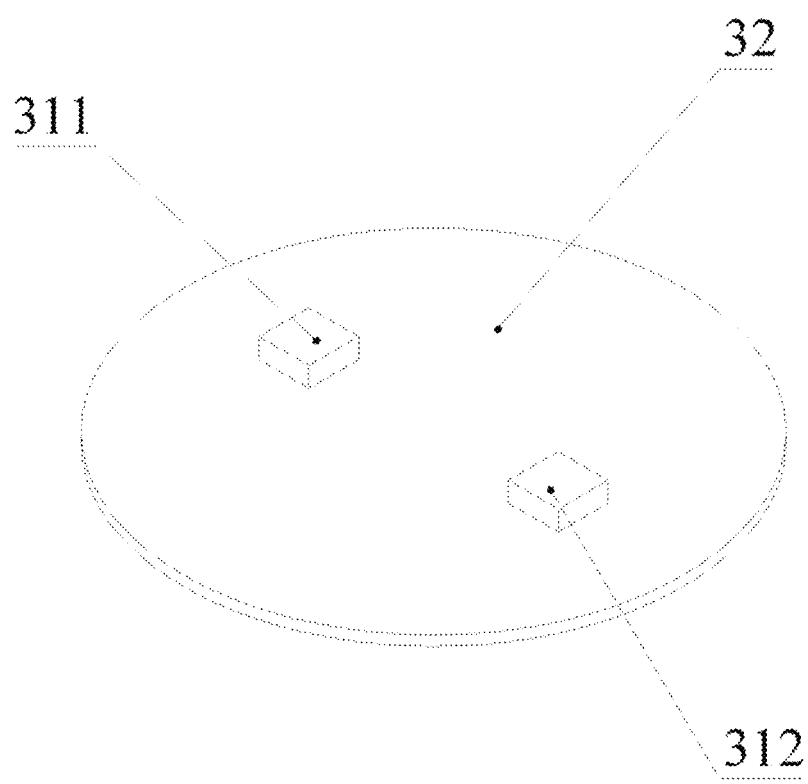
FIG. 2 is a schematic diagram of an embodiment of an acceleration detection component provided by the present invention.
Figure 3:
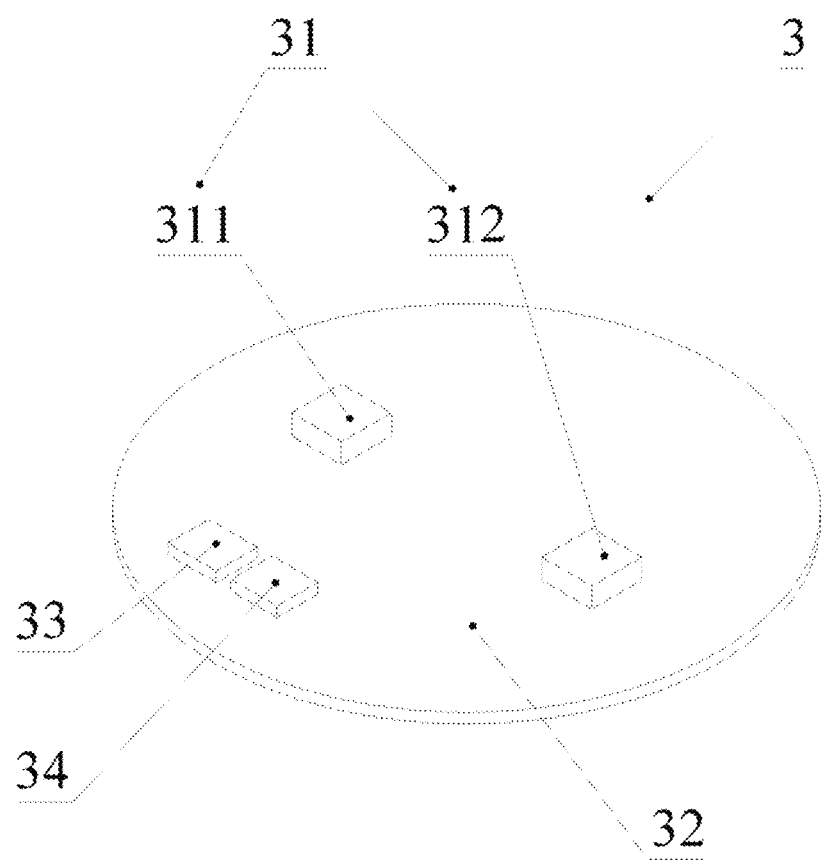
FIG. 3 is a schematic diagram of a circuit board provided by the present invention.

Further, please refer to FIGS. 2 and 3, as a preferred solution, in this embodiment, the acceleration detection component includes a first accelerometer 311 and a second accelerometer 312. The first accelerometer 311 and the second accelerometer 312 are symmetrically arranged on the circuit board with the rotation axis of the rotating body as the center.

The acceleration detection data includes the first detection data obtained by the first accelerometer 311 and the second detection data obtained by the second accelerometer 312. The position parameter includes a first rotation radius of the first accelerometer 311 or the second accelerometer 312.

In this embodiment, two accelerometers are used to form the acceleration detection component, and the spatial position layout of the two accelerometers is cleverly designed. They are symmetrically arranged on the circuit board in the center, and the rotation radii of the two accelerometers are the same, so only the first rotation radius of one accelerometer is used to participate in the calculation.

Specifically, as shown in FIG. 2, the measuring axis of the first accelerometer 311 and the measuring axis of the second accelerometer 312 are symmetrically arranged with respect to the rotation axis, and rotate synchronously with the rotary device 1; R1 is the rotation radius of the two accelerometers 31; $a_1$ is the first detection data on the measuring axis when the first accelerometer 311 rotates; $a_2$ is the first detection data on the measuring axis when the second accelerometer 312 rotates.

Figure 4:
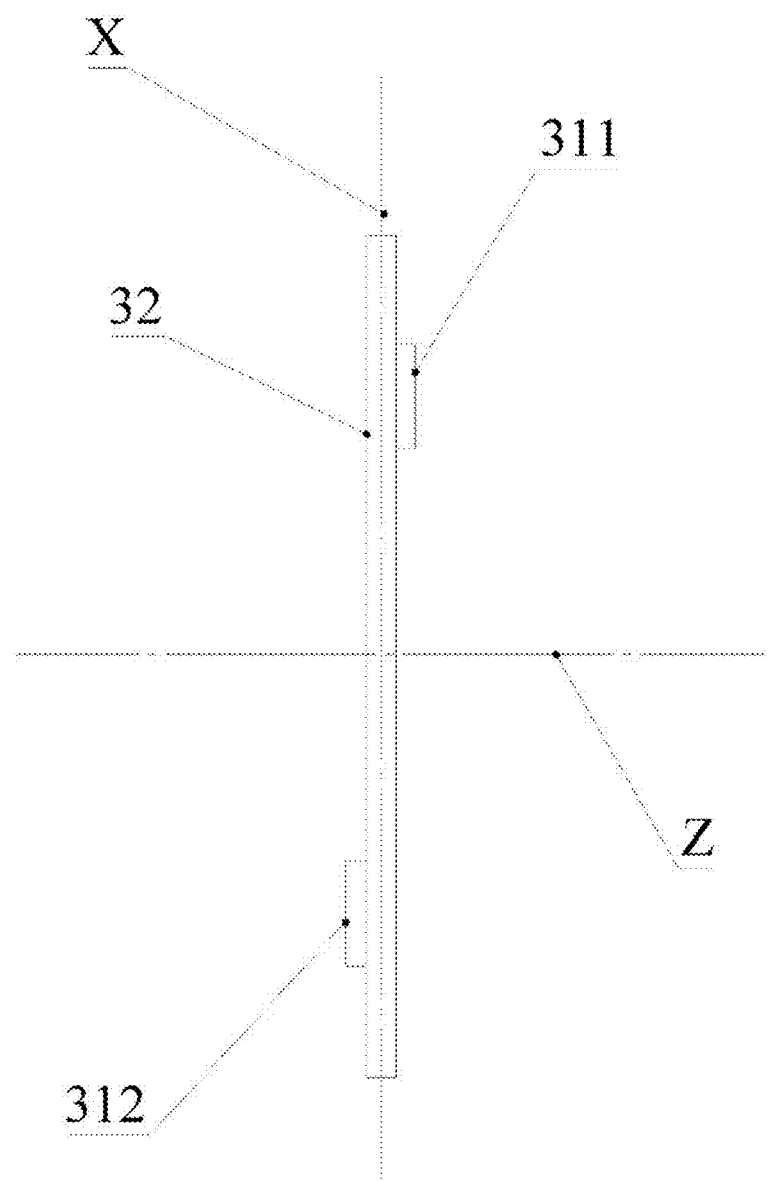
FIG. 4 is a schematic diagram of an embodiment of an acceleration detection component including two accelerometers provided by the present invention.

Specifically, as shown in FIG. 4, the measuring axes of the first accelerometer 311 and the second accelerometer 312 are arranged symmetrically with respect to the rotating axis of the circuit board 32, which can also be understood as being arranged symmetrically with respect to the rotating axis of the rotary device. Specifically, there is an accommodation space between the first accelerometer 311 and the second accelerometer 312, and the accommodation space is provided with the circuit board 32, where Z is the rotation axis of the rotary device; X is the axis perpendicular to and intersecting the axis of rotation of the rotary device.

Specifically, as shown in FIG. 2, the first accelerometer 311 and the second accelerometer 312 electrically connected to the circuit board 32, specifically the control module 34, are connected to the first accelerometer 311 and the second accelerometer 312 respectively, wherein the measuring axis of the first accelerometer 311 and the measuring axis of the second accelerometer 312 are arranged centrosymmetrically with respect to the rotating axis of the rotary device 1, and the circuit board 32, the first accelerometer 311 and the second accelerometer 312 rotate synchronously with the rotating device 1.

Further, as a preferred solution, in this embodiment, the period number of the circuit board is obtained based on the acceleration value and the position parameter, specifically including:

obtaining the period number based on a first period number calculation formula; the first period number calculation formula is:

$$T=\sqrt{8\pi^2 R_1/(a_1+a_2)};$$

where T is the period number; R1 is a first rotation radius; $a_1$ is the first detection data; $a_2$ is the second detection data.

In this embodiment, the acquisition process of the rotational speed value specifically includes:

according to the first detection data, the second detection data and the acceleration value calculation formula, calculating the acceleration value of the predetermined position, wherein the acceleration value calculation formula is:

the acceleration value=$(a_1+a_2)/2$; $a_1$ is the first detection data detected on the measuring axis when the first accelerometer 311 rotates; $a_2$ is the first detection data detected on the measuring axis when the second accelerometer 312 rotates.

Through the acceleration value, the period number of the rotary device 1 is calculated, including:

according to the acceleration value and the calculation formula of the period number, calculating the period number of the rotary device 1, wherein the calculation formula of the period number is:

$T=\sqrt{8\pi^2 R_1/(a_1+a_2)}$, where T is the period number, and R1 is the first rotation radius of the first accelerometer 311 and the second accelerometer 312 relative to the rotation axis of the circuit board 32.

Further, the rotation speed of the rotary device 1 is calculated through the calculation formulas of the period number and the rotation speed, wherein the calculation formula of the rotation speed is:

f=1/T, where f is the speed value.

The rotational imaging method of the present application can quickly and accurately measure the first detection data and the second detection data through the symmetrically arranged first accelerometer 311 and the second accelerometer 312, and quickly calculate the rotational speed based on the first detection data, so as to obtain the control mode corresponding to the rotational speed and realize the rotational imaging of the lamp belt module group 4. Therefore, the rotary imaging method provided by the present invention can accurately measure the rotating speed of the lamp belt, and perform rotary imaging of the lamp belt according to the measured rotating speed.

Further, as a preferred solution, in this embodiment, the period number of the circuit board is obtained based on the acceleration value and the position parameter, specifically including:

acquiring a static detection value and a position deviation value of the first accelerometer 311 and the second accelerometer 312;

performing compensation calculation based on the first detection data, the second detection data, the first rotation radius, the static detection value and the position deviation value to obtain the period number; wherein the formula of the compensation calculation is:

$$T=\sqrt{4\pi^2(2R_1+\Delta R)/(a_1+a_2-a_0)};$$

where T is the period number; R1 is the rotation radius; $\Delta R$ Is the position deviation value of the first accelerometer 311 and the second accelerometer 312; $a_1$ is the first detection data; $a_2$ is the second detection data; $a_0$ is the static detection value of the first accelerometer 311 and the second accelerometer 312.

Specifically, the formula acquisition process of compensation calculation includes:

specifically, setting ω as the angular velocity, R as the rotation radius, $\Delta R_1$ and $\Delta R_2$ as the position deviations of the two accelerometers in the radial direction, a as the acceleration of external force (excluding gravity), $a_1$ and $a_2$ as the detection data of the measuring axes of the two accelerometers, and $a_{10}$ and $a_{20}$ as the detection data of the measuring axes of the two accelerometers at a static time.

Because the measuring axis of the first accelerometer 311 and the measuring axis of the second accelerometer 312 are arranged centrosymmetrically with respect to the rotation axis, the phases of the first accelerometer 311 and the second accelerometer 312 are different by π radians (180°), so then:

③$a_1-a_{10}=\omega^2(R+\Delta R_1)+a+g \sin a \cos(\omega t)$;

$a_2-a_{20}=\omega^2(R+\Delta R_2)-a+g \sin e\ a \cos(\omega t+\pi)$ equivalent to ④$a_2-a_{20}=\omega^2(R+\Delta R_2)-a-g \sin a \cos(\omega t)$ add ③ and ④ to obtain:

$a_1+a_2-(a_{10}+a_{20})=\omega^2(2R+\Delta R_1+\Delta R_2)$;

$a_1+a_2-(a_{10}+a_{20})=\omega^2(2R+\Delta R_1+\Delta R_2)$;

let $a_0=a_{10}+a_{20}$, $\Delta R=\Delta R_1+\Delta R_2$;

then: ⑤$a_1+a_2-a_0=\omega^2(2R+\Delta R)$, equivalent to $\Delta R=(a_1+a_2-a_0)/\omega^2-2R$ Substituting the calculation formula $\omega=2\pi/T$ of the angular velocity into ⑤ formula, then:

$a_1+a_2-a_0=(2\pi/T)^2(2R+\Delta R)$;

then the expression for calculating the compensation of the period number is:

$$T=\sqrt{4\pi^2(2R+\Delta R)/(a_1+a_2-a_0)};$$

in the above formula, $a_0$ is the sum of the detection data of the measuring axes of two accelerometers at the static moment, which can be easily obtained, but $\Delta R$ needs to be obtained on a calibration platform with known rotation speed ω; after the obtained value of $\Delta R$ is obtained, it is substituted into the period calculation formula together with the value of $a_0$, and then the rotation speed of the rotary device is finally calculated by using the rotation speed calculation formula f=1/T.

It should be noted that since each accelerometer 31 has zero-point deviation, it is also possible to calibrate the accelerometer 31 during use to reduce the numerical error. In addition, there may be position deviation during the placement of the accelerometer 31, so it is necessary to perform calibration compensation before calculating the rotation speed of the rotary device 1.

Figure 5:
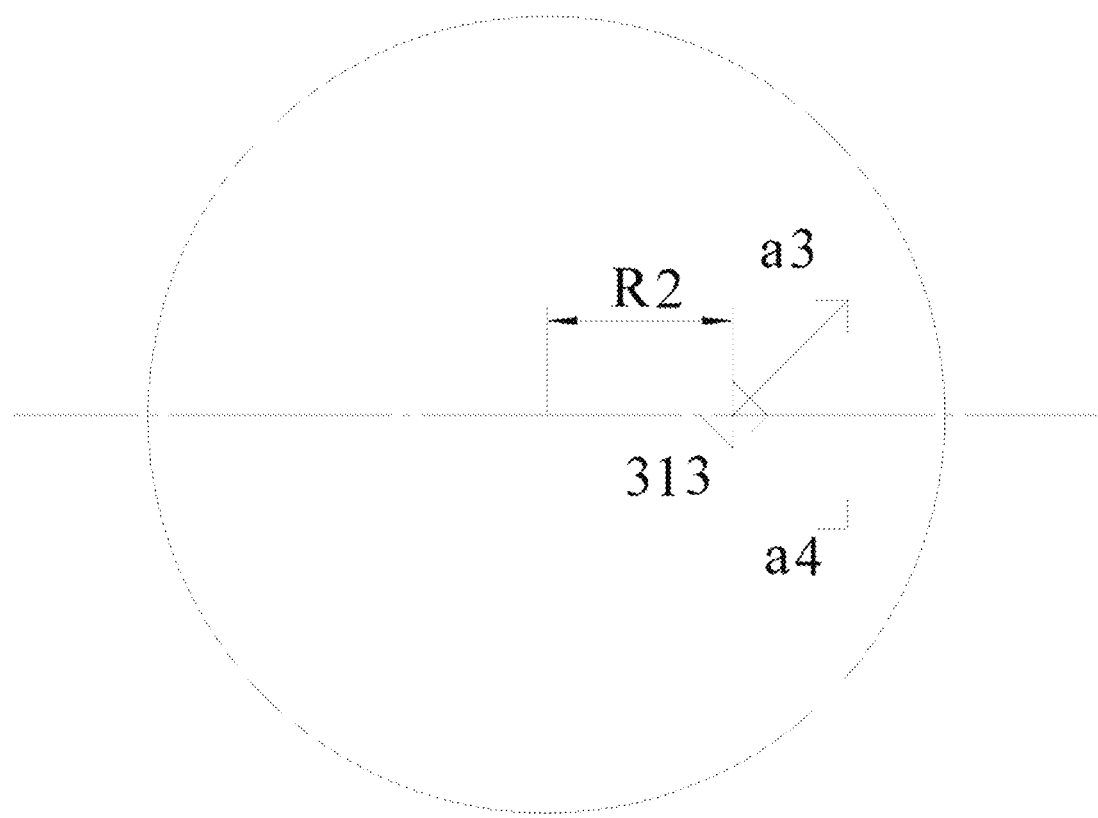
FIG. 5 is a schematic diagram of another embodiment of the acceleration detection component provided by the present invention.

Further, please refer to FIG. 5. As a preferred solution, in this embodiment, the acceleration detection component includes a third accelerometer 313; taking the connecting line between the third accelerometer 313 and the rotation center of the circuit board as the axis, the third accelerometer 313 has a first speed measuring direction deviating from the axis by a first predetermined angle and a second speed measuring direction deviating from the axis by a second predetermined angle; the acceleration detection data includes first direction detection data corresponding to a first speed measuring direction and second direction detection data corresponding to a second speed measuring direction; the position parameter includes the second rotation radius of the third accelerometer 313; the sum of the first predetermined angle and the second predetermined angle is 90 degrees; that is, in this embodiment, the acceleration detection component includes an accelerometer, which can simultaneously detect detection data in two directions. Preferably, when only one acceleration timer is included in the acceleration component, the accelerometer is a two-axis accelerometer.

The control module 34 is further configured to determine whether the rotating surface of the circuit board is horizontal based on the first direction detection data and the second direction detection data, and if so, use a second period number calculation formula to obtain a period number based on the first direction detection data, the second direction detection data and the second rotation radius; the second period number calculation formula is:

$$T=2\pi/\sqrt{(a_3\text{COS}\theta+a_4\text{SIN}\theta)/R_2};$$

where T is the period number; $a_3$ is the first direction detection data; $a_4$ the second irection detection data; $R_2$ is the second rotation radius; $\theta$ is a first predetermined angle.

When the first predetermined angle is 45 degrees, the corresponding second period calculation formula is:

$$T=2\pi/\sqrt{((a_3+a_4)/\sqrt{2})/R_2};$$

where T is the period number; $a_3$ is the first direction detection data; $a_4$ the second irection detection data; $R_2$ is the second rotation radius. Meanwhile, when the first predetermined angle is 45 degrees, it is also a preferred embodiment.

That is, in this embodiment, the rotary device includes:
a rotating module group 2 including a rotating module 21 and a driving module 22, wherein the rotating module 21 is arranged at the bottom of the driving module 22 and connected with the driving module 22;
a control module group 3 arranged on the top of the driving module 22, and including a circuit board 32, a third accelerometer 313, a memory 33, and a control module 34, which is electrically connected with the third accelerometer 313, wherein the rotation axis of the driving module 22 coincides with the rotation axis of the circuit board 32, and the third accelerometer 313 is offset from the rotation center of the circuit board 32, and the connecting line between the third accelerometer 313 and the rotation center is defined as an axis; the third accelerometer 313 has a first speed measuring direction and a second speed measuring direction at an angle deviating from the axis by 45 degrees;
a lamp belt module group 4 electrically connected with the circuit board 32;
the rotary imaging method includes the following steps:
the driving module 22 driving the rotating module 21, the control module group 3 and the lamp belt module group 4 to rotate, and the rotary device forming an included angle with the horizontal plane;
obtaining the accurate period number by calculation, and calculating the rotation speed of the circuit board 32;
obtaining a control mode corresponding to the rotation speed value, and controlling the lamp belt module group 4 to emit light at the rotation speed according to the control mode, so as to realize rotary imaging.

Further, in some embodiments, the judging operation of detecting whether the circuit board is horizontal specifically includes:
if abs($a_3-a_4$)<(a small number such as: 1) for a long time (for example, for 10 times continually) by software, then determining that the rotating plane is not horizontal, by which whether the rotation plane is horizontal or not can be quickly judged.

Figure 6:
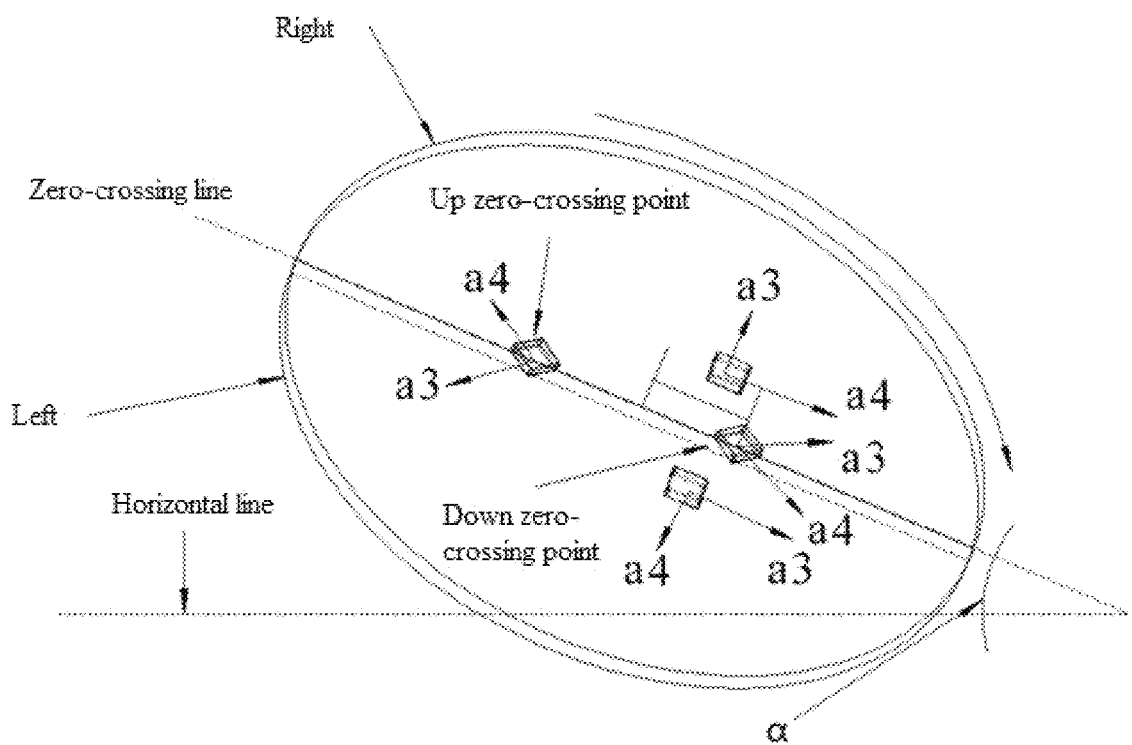
FIG. 6 is a schematic diagram of the definition parameters of an acceleration detection component including an accelerometer provided by the present invention.

Further, please refer to FIG. 6. As a preferred solution, in this embodiment, if the rotating surface is in a non-horizontal state, then:
the acceleration detection data of the up zero-crossing point and the down zero-crossing point are acquired respectively; the up zero-crossing point is the highest relative horizontal position of rotation of the third accelerometer 313, and the down zero-crossing point is the lowest relative horizontal position of rotation of the third accelerometer 313; specifically, when the driving module drives the rotating module 21, the control module group 3 and the lamp belt module group 4 to rotate, and the rotary device forms an included angle with the horizontal plane, the distance of the third accelerometer 313 in a rotation period is defined to obtain an up zero-crossing section and a down zero-crossing section, wherein the up zero-crossing section includes an up zero-crossing point, the down zero-crossing section includes a down zero-crossing point, the connecting line between the up zero-crossing point and the down zero-crossing point defines a zero-crossing line; the up zero-crossing point is the highest relative horizontal point of rotation of the third accelerometer 313, and the down zero-crossing point is the lowest relative horizontal point of rotation of the third accelerometer 313; the detection data of the measuring axis in the first speed measuring direction of the first accelerometer 311 is defined as $a_3$, the detection data of the measuring axis in the second speed measuring direction of the first accelerometer 311 is $a_4$, and the acceleration of gravity is g. The highest horizontal point to which the first accelerometer 311 rotates is defined as the "up zero-crossing point", and the lowest horizontal point to which the first accelerometer 311 rotates is defined as the "down zero-crossing point", and the connecting line between the "up zero-crossing point" and "down zero-crossing point" is defined as the "zero-crossing point", wherein a is the included angle between the zero-crossing line and the horizontal line, that is, the included angle formed by the rotary device 1 and the horizontal plane.

The rotary device forms an included angle with the horizontal plane, that is, when the included angle α is greater than zero, the detection data of the measuring axes in the first speed measuring direction and the second speed measuring direction of the first accelerometer 311 at the up zero-crossing point are set to be $a_3$up and $a_4$up, respectively; the detection data of the measuring axes in the first speed measuring direction and the second speed measuring direction of the first accelerometer 311 at the down zero-crossing point are set to be $a_3$down and $a_4$down, respectively.

Through this definition and the third period number calculation formula, the period number up to this time can be calculated.

The period number is obtained based on the acceleration detection data of the up zero-crossing point and the down zero-crossing point and the second rotation radius by using a third period calculation formula; the third period calculation formula is:

$$T = 2\pi / \sqrt{((a_3 up * \cos\theta + a_4 up * \sin\theta + a_3 down * \cos\theta + a_4 down * \sin\theta)/R_2)/2};$$

where T is the period number, and $a_3 up$ is the first direction detection data of the up zero-crossing point; $a_4 up$ is the second direction detection data of the up zero-crossing point; $a_3 down$ is the first direction detection data of the down zero-crossing point; $a_4 down$ is the second direction detecting data of the down zero-crossing point; $R_2$ is the second rotation radius; θ is a first predetermined angle.

When the first predetermined angle is 45 degrees, the corresponding third period number calculation formula is:

$$T = 2\pi / \sqrt{(((a_3 up + a_4 up)/\sqrt{2} + (a_3 down + a_4 down)/\sqrt{2})/R)/2}.$$

According to the present invention, the acceleration value caused by rotation is separated through hardware structure filtering, and then the rotation speed value is calculated; in this embodiment, the instantaneous speed can be calculated by reading the acceleration value at a single point, so that the present invention has extremely high response speed, avoids the defect that a reference point needs to be stationary in the existing calculation method, can effectively measure the speed of a suspended object, and has good anti-interference ability; even on a carrier with any turbulence, the rotation speed of the rotating platform to the ground can be accurately measured without interference from the carrier, and the obtained instantaneous speed can be obtained.

Further, in practical application, there are gravity acceleration, centripetal acceleration and other accelerations caused by other external forces in the rotary device 1, such as external forces caused by wind and touching other objects. In the present invention, in order to overcome the defect of inaccurate measurement caused by external force, the position of the accelerometer is further defined, and based on this position definition, the detection method based on up zero-crossing and down zero-crossing is specifically defined, that is, in this application, the influence of external forces is filtered by the specific combination of specific structure definition (the accelerometer has the first speed measuring direction and the second speed measuring direction which are 45 degrees away from the axis) and the corresponding speed measuring method, so that the speed measurement influenced by other external forces is solved, and the speed measuring efficiency is improved and the real-time performance is met.

Further, as a preferred solution, in this embodiment, the steps of obtaining the rotation speed value of the circuit board specifically include:

matching from a period database based on the acceleration detection data and the position parameter to obtain the period number; wherein the period database comprises period numbers of a plurality of position parameters under different acceleration values; and obtaining the rotation speed value based on the period number. That is to say, the period number can be obtained only by looking up the table, which can not only get the accurate speed value more quickly.

In some embodiments, before calculating the rotational speed value, it further includes:

formulating the acceleration detection data and the period numbers at different predetermined positions (that is, measuring axes with different rotation radii) into data tables in a one-to-one correspondence manner, and then forming a period database, so that the corresponding period number can be found according to the measured acceleration detection data and the corresponding position parameter when calculating the rotational speed.

It should be noted that, in order to avoid complicated floating-point calculation such as square root, the period number corresponding to the detection data of the measuring axis of each accelerometer 31 can be calculated in advance by the computer, and a data table can be made in advance, and then the rotation speed of the rotary device 1 can be quickly calculated by looking up the table in the actual speed measurement process. In other embodiments, the rotary device 1 can also be equipped with a control module 34 that can perform complex mathematical operations, and in the process of scanning and imaging the lamp belt, the real-time rotational speed value can be obtained through real-time mathematical calculations, so that the lamp belt imaging can be controlled in real time.

Further, the measuring range of the accelerometers in the above embodiments is preferably ±16 g, and the maximum rotational speed that can be measured by the accelerometer in this measuring method provided by the present invention is 36.8. When the rotational speed of the rotary device 1 exceeds this threshold, the reading of the accelerometer will overflow, that is, the finally measured rotational speed deviates from the actual rotational speed of the rotary device 1.

Therefore, in some embodiments of the present application, in order to calculate the faster rotation speed, the spatial position layout of the accelerometer is configured to be closer to the rotation axis, that is, the rotation center of the circuit board 32, so as to obtain a smaller rotation radius and further calculate the faster rotation speed. In some embodiments, it is also possible to rotate the accelerometer by an angle, so that the acceleration value generated when the rotary device 1 rotates is not all reflected in one axial direction of the accelerometer, but an angular decomposed component is reflected in one axial direction of the accelerometer, which will also improve the overflow problem of the accelerometer to some extent. In this application, the firm placement of the accelerometer is also one of the important conditions that the accelerometer will not overflow.

Figure 9:
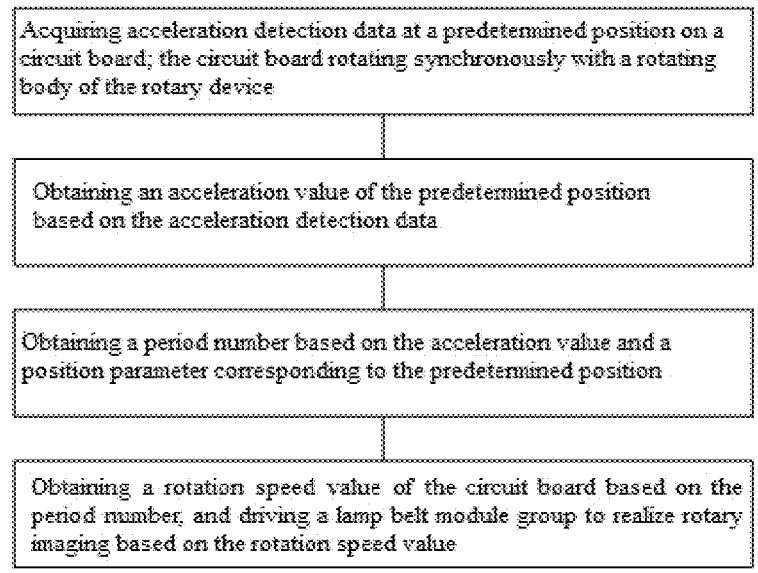
FIG. 9 is a flowchart of the rotary imaging method provided by the present invention.

Accordingly, referring to FIG. 9, the present invention provides a rotation imaging method of a rotary device, which includes:

acquiring acceleration detection data at a predetermined position on a circuit board; the circuit board rotating synchronously with a rotating body of the rotary device;

obtaining an acceleration value of the predetermined position based on the acceleration detection data;

obtaining a period number based on the acceleration value and a position parameter corresponding to the predetermined position; and obtaining a rotation speed value of the circuit board based on the period number, and driving a lamp belt module group to realize rotary imaging based on the rotation speed value.

Correspondingly, the present invention provides a rotary device and a rotary imaging system using the rotary device.

The application also provides a rotary device 1 for implementing the above rotary imaging method, and the rotary device 1 includes:

a rotating module group 2 including a rotating module 21 and a driving module 22, wherein the rotating module 21 is arranged at the bottom of the driving module 22 and connected with the driving module 22;

a control module group 3 arranged on the top of the driving module 22, and including a circuit board 32, a first accelerometer 311 and a second accelerometer 312, wherein the circuit board 32 is electrically connected with the first accelerometer 311 and the second accelerometer 312, and the rotation center of the driving module 22 coincides with the rotation center of the circuit board 32, and the first accelerometer 311 and the second accelerometer 312 are symmetrically arranged on the circuit board 32 with the rotation center of the circuit board 32 as the origin;

a lamp belt module group 4 electrically connected with the circuit board 32;

wherein the driving module 22 is used to drive the rotating module 21, the control module group 3 and the lamp belt module group 4 to rotate, and the circuit board 32 is used to calculate the current rotation speed through the detection data of the first accelerometer 311 and the second accelerometer 312, and control the lamp belt module group 4 to display the graphics preset by the user according to the rotation speed.

It should be noted that, as shown in FIG. 3, the circuit board 32 also includes a memory 33 and a control module 34, wherein the memory 33 is electrically connected with the first accelerometer 311 and the second accelerometer 312, and the memory 33 is used for storing the detection data of the measuring axes of the first accelerometer 311 and the second accelerometer 312, and the control module 34 is electrically connected with the memory 33 and the lamp belt module group 4, and is used for calculating the rotary device 1 according to the detection data of the measuring axes stored in the memory 33, and controls the lamp belt module 4 to display graphics according to the rotation speed.

It should be noted that the circuit board 32 is also provided with an input terminal and an output terminal. The input terminal is used for acquiring the detection data of the measuring axis of the accelerometer 31, and the output terminal is used for outputting the rotational speed data calculated by the control module 34. In addition, the circuit board 32 is also provided with a circuit (not shown in the figure) which can provide data channels for the input terminal and the output terminal, and the memory 33 and the control module 34 therein.

It should be noted that the lamp belt module group 4 rotates by 360 degrees about the axis line, and is divided into a plurality of display intervals according to preset graphic data, and each display interval has corresponding display contents; the light bar displays the corresponding content in the display interval according to the rotating speed of the rotary device 1; according to the contents displayed in multiple display intervals, a complete preset graph is combined. At this time, because the lamp belt obtains the instantaneous rotation speed of the rotary device 1, the scanning imaging quality of the lamp belt can be higher, and the graphics can be displayed more stably and clearly.

As shown in FIG. 8, the rotating module 21 includes a propeller 211, and the driving module 22 includes a bracket 221. A power supply (not shown in the figure), a motor and a transmission gear are arranged in the bracket 221, wherein the propeller 211 is fixedly connected with the bracket 221, and the motor is in transmission connection with the bracket 221 through the transmission gear.

In this embodiment, the motor drives the bracket 221 to rotate, and then the bracket 221 drives the propeller 211 to rotate, so that the rotary device 1 finally rotates.

It should be noted that, as shown in FIG. 8, in order to make the rotary device 1 rotate more stably, this embodiment is also provided with a central axis 5, which is coincident with the rotating axis of the rotary device 1, so that the overall rotation of the rotary device 1 can be more stable.

It should be noted that, in order to facilitate the introduction of the solution, the rotary device in FIG. 8 is an inverted example, and when it is used, the rotor faces upwards.

It should be noted that, as shown in FIG. 7, in order to protect the rotary device 1, this embodiment is also provided with a protective device 6, which is composed of a plurality of ribs made of elastic materials connected with each other and fixedly connected with a bracket 221, so that the external force on the rotary device 1 can be effectively buffered and the components in the protective device 6 can be effectively protected.

In this embodiment, the driving module 22 is electrically connected with the control module group 3 to drive the rotation of the rotating module 21, and the lamp belt module group 4 is electrically connected with the control module group 3 and is in transmission connection with the driving module 22 for displaying a preset graphics when the rotary device 1 rotates.

In order to display the graphics displayed by the lamp belt module group 4 more clearly, in this embodiment, the lamp belt module group 4 is arranged on the protective device 6, and in some embodiments, the lamp belt module group 4 can also be arranged inside the protective device 6 in order to protect the lamp belt module group 4.

It can be understood that those skilled in the art can make equivalent substitutions or changes according to the technical solution of the present invention and its inventive concept, and all these changes or substitutions should belong to the protection scope of the appended claims.

What is claimed is:

1. A rotary imaging system of a rotary device, comprising:
a rotating body with a lamp belt module group;
a circuit board installed on the rotating body, the circuit board rotating synchronously with the rotating body;
an acceleration detection component installed at a predetermined position on the circuit board for acquiring acceleration detection data at the predetermined position when the circuit board rotates; and
a control module installed on the circuit board and respectively connected with the lamp belt module group and the acceleration detection component, used for obtaining an acceleration value of the predetermined position based on the acceleration detection data, further obtaining a rotation speed value of the circuit board based on the acceleration value and a position parameter corresponding to the predetermined position, and driving the lamp belt module group to realize rotary imaging based on the rotation speed value; and
wherein the acceleration detection component comprises a first accelerometer and a second accelerometer.

2. The rotary imaging system of a rotary device according to claim 1, wherein the acceleration value of the predetermined position is obtained based on the acceleration detection data, and the rotation speed value of the circuit board is further obtained based on the acceleration value and the position parameter corresponding to the predetermined position, which specifically comprises:
obtaining the acceleration value based on the acceleration detection data;
obtaining a period number of the circuit board based on the acceleration value and the position parameter; and
obtaining the rotation speed value based on the period number.

3. The rotary imaging system of a rotary device according to claim 2, wherein the first accelerometer and the second accelerometer are symmetrically arranged on the circuit board with a rotation axis of the rotating body as a center;
the acceleration detection data comprise first detection data obtained by the first accelerometer and second detection data obtained by the second accelerometer; the position parameter comprises a first rotation radius of the first accelerometer or the second accelerometer.

4. The rotary imaging system of a rotary device according to claim 3, wherein obtaining the period number of the circuit board based on the acceleration value and the position parameter specifically comprises:
obtaining the period number based on a first period number calculation formula; wherein the first period number calculation formula is:

$$T=\sqrt{8\pi^2 R_1/(a_1+a_2)};$$

where T is the period number; $R_1$ is the first rotation radius; $a_1$ is the first detection data; $a_2$ is the second detection data.

5. The rotary imaging system of a rotary device according to claim 3, wherein obtaining the period number of the circuit board based on the acceleration value and the position parameter specifically comprises:
acquiring a static detection value and a position deviation value of the first accelerometer and the second accelerometer;
performing compensation calculation based on the first detection data, the second detection data, the rotation radius, the static detection value and the position deviation value to obtain the period number; wherein a formula of the compensation calculation is:

$$T=\sqrt{4\pi^2(2R_1+\Delta R)/(a_1+a_2-a_0)};$$

where T is the period number; $R_1$ is the rotation radius; $\Delta R$ the position deviation value of the first accelerometer and the second accelerometer; $a_1$ is the first detection data; $a_2$ is the second detection data; $a_0$ is the static detection value of the first accelerometer and the second accelerometer.

6. The rotary imaging system of a rotary device according to claim 2, wherein the acceleration detection component comprises a third accelerometer; by taking a connecting line between the third accelerometer and a rotation center of the circuit board as an axis, the third accelerometer has a first speed measuring direction deviating from the axis by a first predetermined angle and a second speed measuring direction deviating from the axis by a second predetermined angle; the acceleration detection data comprises first direction detection data corresponding to the first speed measuring direction and second direction detection data corresponding to the second speed measuring direction; the position parameter comprises a second rotation radius of the third accelerometer; a sum of the first predetermined angle and the second predetermined angle is 90 degrees;
the control module is further used for judging whether a rotating surface of the circuit board is horizontal based on the first direction detection data and the second direction detection data, and if so, using a second period number calculation formula to obtain the period number based on the first direction detection data, the second direction detection data and the second rotation radius; the second period number calculation formula is:

$$T=2\pi/\sqrt{(a_3\cos\theta+a_4\sin\theta)/R};$$

where T is the period number; $a_3$ is the first direction detection data; $a_4$ the second direction detection data; $R_2$ is the second rotation radius; $\theta$ is a first predetermined angle.

7. The rotary imaging system of a rotary device according to claim 6, wherein if the rotating surface is not horizontal, the following steps are executed:
respectively acquiring the acceleration detection data of an up zero-crossing point and a down zero-crossing point; wherein the up zero-crossing point is a position with a highest relative horizontal plane of rotation of the third accelerometer, and the down zero-crossing point is a position with a lowest relative horizontal plane of rotation of the third accelerometer;
using a third period calculation formula to obtain the period number based on the acceleration detection data of the up zero-crossing point and the down zero-crossing point and the second rotation radius; the third period number calculation formula is:

$$T=2\pi/\sqrt{((a_3up*\cos\theta+a_4up*\sin\theta+a_3down*\cos\theta+a_4down*\sin\theta)/R_2)/2};$$

wherein, T is the period number, and $a_3up$ is the first direction detection data of the up zero-crossing point; $a_4up$ is the second direction detection data of the up zero-crossing point; $a_3down$ is the first direction detection data of the down zero-crossing point; $a_4down$ is the second direction detecting data of the down zero-crossing point; $R_2$ is the second rotation radius; $\theta$ is a first predetermined angle.

8. The rotary imaging system of a rotary device according to claim 1, wherein the step of acquiring the rotation speed value of the circuit board specifically comprises:
matching from a period database based on the acceleration detection data and the position parameter to obtain the period number; wherein the period database comprises period numbers of a plurality of position parameters under different acceleration values; and
obtaining the rotation speed value based on the period number.

9. A rotary imaging method of a rotary device, comprising:
acquiring, from an acceleration detection component comprising a first accelerometer and a second accelerometer, acceleration detection data at a predetermined position on a circuit board; the circuit board rotating synchronously with a rotating body of the rotary device;
obtaining an acceleration value of the predetermined position based on the acceleration detection data;
obtaining a period number based on the acceleration value and a position parameter corresponding to the predetermined position; and
obtaining a rotation speed value of the circuit board based on the period number, and driving a lamp belt module group to realize rotary imaging based on the rotation speed value.

10. A rotary device using the rotary imaging system of a rotary device according to claim 1.

11. A rotary device using the rotary imaging system of a rotary device according to claim 2.

12. A rotary device using the rotary imaging system of a rotary device according to claim 3.

13. A rotary device using the rotary imaging system of a rotary device according to claim 4.

14. A rotary device using the rotary imaging system of a rotary device according to claim 5.

15. A rotary device using the rotary imaging system of a rotary device according to claim 6.

16. A rotary device using the rotary imaging system of a rotary device according to claim 7.

17. A rotary device using the rotary imaging system of a rotary device according to claim 8.

* * * * *